United States Patent [19]

Ludwig et al.

[11] 4,038,465
[45] July 26, 1977

[54] SODIUM SULFUR BATTERY OR CELL WITH EXTERNAL STORAGE

[75] Inventors: Frank A. Ludwig, Southfield; Steven A. Weiner, Farmington Hills, both of Mich.

[73] Assignee: Ford Motor Company, Dearborn, Mich.

[21] Appl. No.: 630,876

[22] Filed: Nov. 11, 1975

[51] Int. Cl.² ............................................. H01M 4/36
[52] U.S. Cl. ..................................................... 429/104
[58] Field of Search ...................... 136/6 F, 6 FS, 154; 429/102–104, 218

[56] References Cited
U.S. PATENT DOCUMENTS

| | | | |
|---|---|---|---|
| 3,404,036 | 10/1968 | Kummer et al. | 136/6 FS |
| 3,458,356 | 7/1969 | Kummer et al. | 136/6 FS X |
| 3,533,848 | 10/1970 | Winn | 136/6 F |
| 3,535,163 | 10/1970 | Dzieciuch et al. | 136/6 FS |
| 3,758,337 | 9/1973 | Fally et al. | 136/6 FS |
| 3,811,943 | 5/1974 | Minck et al. | 136/6 FS |
| 3,837,918 | 9/1974 | Nakabayashi | 136/6 FS |

*Primary Examiner*—C. F. Lefevour
*Attorney, Agent, or Firm*—Roger L. May; Keith L. Zerschling

[57] ABSTRACT

An improved secondary battery or cell of the type having: (A) one or more anodic reaction zones containing a molten alkali metal reactant-anode in electrical contact with an external circuit; (B) one or more cathodic reaction zones containing (1) a cathodic reactant comprising a liquid electrolyte which is electrochemically reversibly reactive with said anodic reactant and which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant and (2) an electrode in contact with said liquid electrolyte; and (C) a cation-permeable barrier to mass liquid transfer interposed between and in contact with said anodic and cathodic reaction zones, said electrode being in electrical contact with both said cation-permeable barrier and an external circuit. The improvement of the invention comprises including as a part of said secondary battery or cell (A) one or more storage zones for said liquid electrolyte which are separate from said one or more cathodic reaction zones and (B) means for flowing said liquid electrolyte from at least one of said storage zones, through said one or more cathodic reaction zones and out of said cathodic reaction zones to at least one of said storage zones. More particularly, the improvement comprises the use of such storage zones and means for flowing in combination with several preferred types of battery or cell design.

23 Claims, 7 Drawing Figures

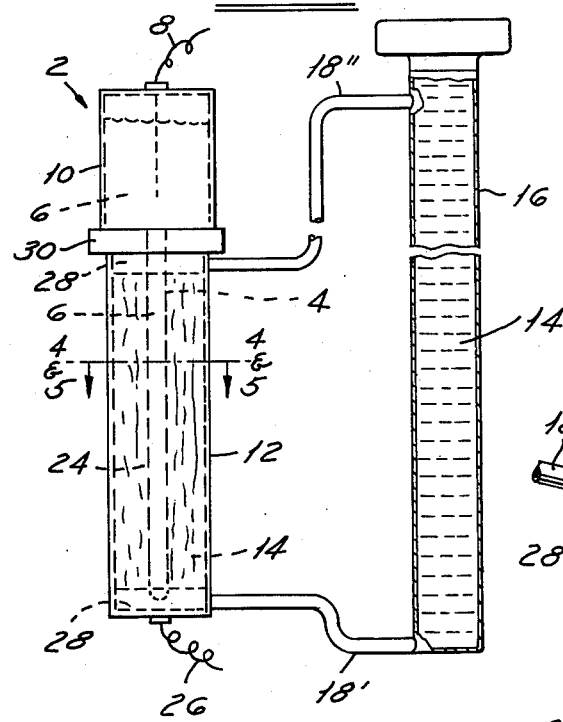
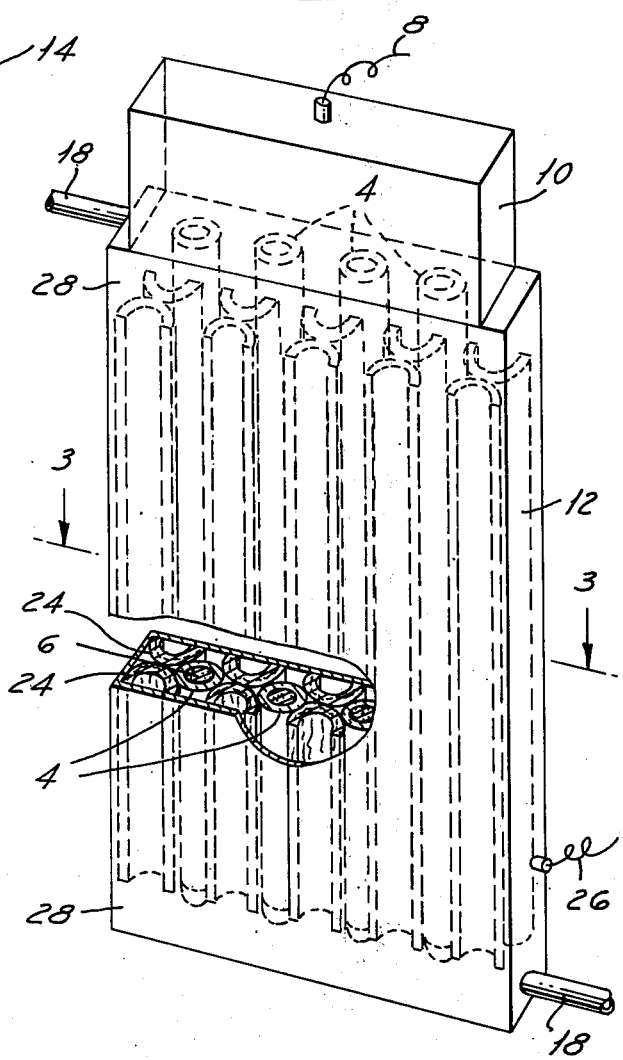
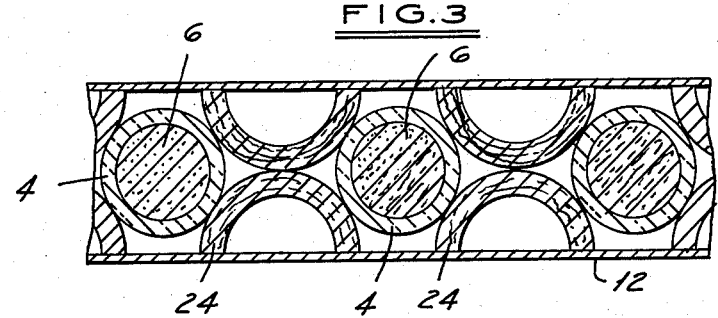

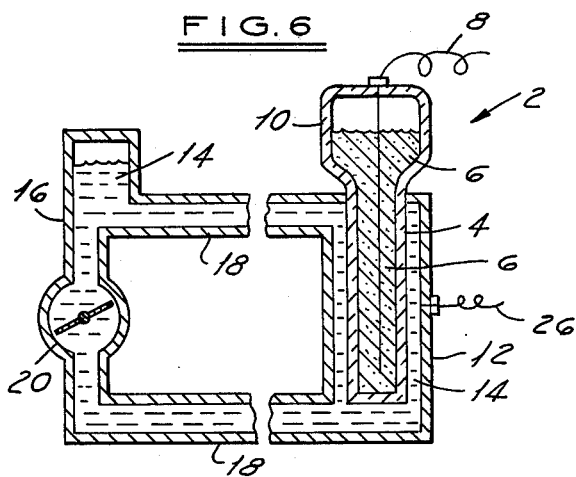
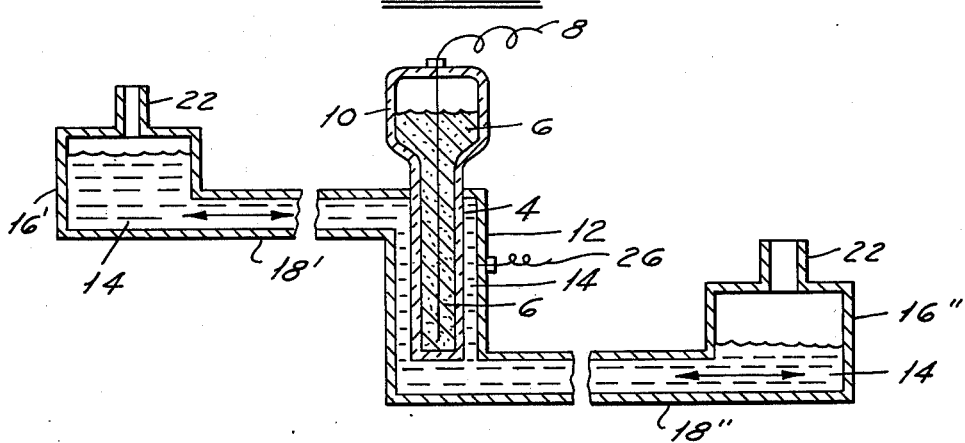
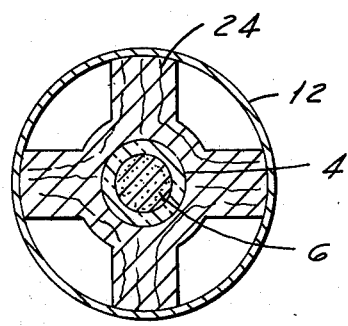
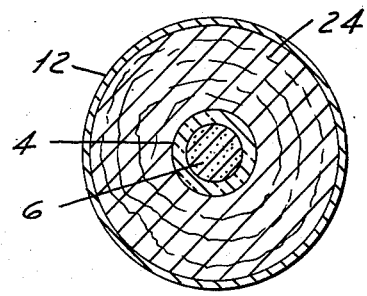

SODIUM SULFUR BATTERY OR CELL WITH EXTERNAL STORAGE

The invention herein described was made in the course of or under a contract or subcontract thereunder with the National Science Foundation.

This application relates to an improved secondary cell or battery of increased ampere-hour capacity.

More particularly, this application relates to an improved, secondary cell or battery of the type comprising at least one molten alkali metal anode, at least one cathod, a liquid electrolyte electrochemically reversibly reactive with said alkali metal and in contact with said cathode, and a cation-permeable barrier to mass liquid transfer interposed between and in contact with said anode and said liquid electrolyte.

This application still more particularly relates to an improved sodium sulfur battery or cell of increased ampere-hour capacity.

BACKGROUND OF THE INVENTION

A recently developed type of secondary or rechargeable electrical conversion device comprises: (1) one or more anodic reaction zones containing a molten alkali metal anode-reactant, e.g., sodium, in electrical contact with an external circuit; (2) one or more cathodic reaction zones containing (a) a cathodic reactant comprising a liquid electrolyte, e.g., sulfur or a mixture of sulfur and molten polysulfide, which is electrochemically reversibly reactive with said anodic reactant, and (b) a conductive electrode which is at least partially immersed in said cathodic reactant; and (3) a solid electrolyte comprising a cationpermeable barrier to mass liquid transfer interposed between and in contact with said anodic and cathodic reaction zones. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysuflfide ions. The polysulfide ions are formed by charge transfer by reaction of the cathodic reactant with electrons conducted through the electrode from the external circuit. Because the ionic conductivity of the liquid electrolyte is less than the electronic conductivity of the electrode material, it is desirable during discharge that both electrons and sulfur be applied to and distributed along the surface of the conductive electrode in the vicinity of the cation-permeable solid electrolyte. When sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the electrode and are conducted through the electrode to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the electrode, charge transfer is inhibited and the charging process is greatly hindered or terminated. Thus, in order to improve the rechargeability of a cell of this type it is necessary not only to supply polysulfide to the surface of the electrode in the vicinity of the cation-permeable membrane, but also to remove sulfur therefrom.

U.S. Pat. No. 3,811,943 and United States patent application Ser. No. 545,048 filed Jan. 29, 1975 now U.S. Pat. No. 3,980,496 both disclose energy conversion device designs which allow or promote improved mass transportation of reactants and reaction products to and from the vicinity of the solid electrolyte and the porous electrode during both discharge and charge. In the device disclosed in the patent an ionically conductive solid electrolyte is located between a first reactant in one container and a second reactant in another container. An electrode for one of the reactants comprises a layer of porous, electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactants. Reactants also flow readily through the conductive member into the layer of porous electronically conductive material. The conductive member distributes electrons to the porous, conductive material which in turn transfers electrons to or from the reactants.

The improvement disclosed in Ser. No. 545,048 comprises designing the cathodic reaction zone of the device such that there are a plurality of channels and/or spaces within said zone which are free of porous conductive electrodes and which are thus adapted to allow free flow of the molten cathodic reactants during operation of the device. This flow results from free convection within the channels and/or spaces, and from wicking of cathodic reactants within the conductive porous material.

The secondary battery or cell designs disclosed and claimed in the aforementioned U.S. patent and Ser. No. 545,048 are effective in promoting distribution of reactants during both charge and discharge, thereby increasing the capacity of the device. However, the capacity of the device is limited by the amount of anodic and cathodic reactant available for reaction.

It is the object of this invention to provide an improved secondary battery or cell which is effective in promoting distribution of reactants during charge and discharge and which provides for an increased supply of reactants, thereby increasing the ampere-hour capacity of the device.

BRIEF DESCRIPTION OF THE INVENTION

The improvement of this invention accomplishes the above objective by including as a part of the secondary battery or cell (A) one or more storage zones for the liquid electrolyte cathodic reactant which zones are separate from the one or more cathodic reaction zones of the device and (B) means for flowing the liquid electrolyte from at least one of said storage zones, through said one or more cathodic reaction zones and out of the cathodic reaction zones to at least one of the storage zones. More particularly, the improvement of the invention comprises the use of such storage zones and means for flowing in combination with several preferred battery or cell designs.

The invention will be more fully understood after reading the following detailed description thereof in conjunction with the drawings in which:

FIGS. 1, 2, 6 and 7 show schematic views of devices embodying the inventions;

FIG. 3 shows a cross-section of the device of FIG. 2 taken along line 3—3; and

FIGS. 4 and 5 show two possible cross-sections of the device of FIG. 1 taken along line 4–5.

DETAILED DESCRIPTION OF THE INVENTION

Description of Devices to Which Invention Relates

Secondary or rechargeable electrical conversion devices to which the invention may relate include those disclosed in the following United States patents, the disclosures of which are incorporated herein by reference: U.S. Pat. No. 3,404,035; 3,404,036; 3,413,150; 3,446,677; 3,458,356; 3,468,709; 3,468,719; 3,475,220; 3,475,223; 3,475,225; 3,535,163; 3,719,531; and 3,811,943.

As mentioned above, the secondary batteries or cells to which the invention relates comprise generally: (A) one or more anodic reaction zones containing a molten alkali metal reactant-anode in electrical contact with an external circuit; (B) one or more cathodic reaction zones containing (1) a cathodic reactant comprising a liquid electrolyte which is electrochemically reversibly reactive with said anodic reactant and which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant and (2) an electrode in contact with said liquid electrolyte; and (C) a cation-permeable barrier to mass liquid transfer interposed between and in contact with said anodic and cathodic reaction zones, said electrode being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

The cathodic reactant is a molten material, e.g., molten sulfur, which is electrochemically reversibly reactive with their anodic reactant. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

Since in the fully discharged state the polysulfide melt is single phase in nature, the activity of sulfur in the melt is substantially less than unity when the mole fraction of sulfur is about 0.60 and approaches unity as the mole fraction approaches 0.72, the point at which the polysulfide is sulfur saturated. As the cell is recharged, elemental sulfur is formed momentarily on the surfaces of the porous electrode in the vicinity of the solid ceramic electrolyte. Since sulfur is nonconductive, the presence of elemental sulfur on the electrode could cause difficulty in continuing the recharging process. However, when the mole fraction of sulfur in the melt is between about 0.60 and about 0.72, i.e., the single phase region, the sulfur which forms on the surface of the electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltage becomes constant.

As charging of the cell or battery continues, the sulfur saturated polysulfide will no longer react with elemental sulfur deposited on the porous electrode to form polysulfide having a greater mole ratio of sulfur to alkali metal. Thus, as the charging cycle continues the cathodic reactant becomes two phase in nature. One phase is elemental sulfur and the other is sulfur saturated alkali metal poly sulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficulties are confronted because of the formation of large amounts of nonconductive elemental sulfur on electrode surfaces. In fact, it is extremely difficult to recharge such secondary cells on batteries to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65 prefereably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F The polycrystalline ceramic materials useful as reaction zone separators of solid electrolytes are bi- or multi-metal oxides. Among the polycrystalline bi- or multimetal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al—O bond chains with sodium ions occupying sites between the aforementioned layers and columns. Among the numerous polycrystalline Beta-typealumina materials useful as reaction zone separators or solid electrolytes are the following:

1. Standard Beta-type-alumina which exhibits the above-discussed crystalline structure comprising a series of layers of aluminum oxide held apart by layers of linear Al—O bond chains with sodium occupying sites between the aforementioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline is $\beta''$-alumina which may be represented by the formula $Na_2O \cdot 6Al_2O_3$. It will be noted that the $\beta'$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide of magnesium oxide or mixtures thereof in amounts ranging from 0.1 to about 5 weight percent.

IMPROVEMENT OF THE INVENTION

The importance of convection and mass transport in supplying reactants to the electrochemical reaction sites in the cathodic reaction zone and also in removing reaction products from the reaction sites has been demonstrated in U.S. Pat. No. 3,811,943and in U.S. patent application Ser. No. 545,048 filed Jan. 29,1975. The improvement of this invention involves means of enhancing the desired convection by utilizing storage of the liquid electrolyte external to the cathodic reaction zone and means for flowing the liquid electrolyte to the reaction zone, thus enhancing convection. This can be achieved by free convection or by forced convection, as will be described.

More particularly, the improvement of this invention comprises including as a part of the secondary battery or cell (A) one or more storage zones for the liquid electrolyte, which zones are separate from the one or more cathodic reaction zones of the device and (B) means for flowing the liquid electrolyte from at least one of said storage zones through the one or more cathodic reaction zones of the battery or cell and out of the cathodic reaction zones to at least one of the storage zones. Still more particularly improvement of the invention comprises the use of such storage zones and means for flowing the electrolyte in combination with various cell or battery designs, several of which are preferred.

FIGS. 1, 6 and 7 show vertical cross-section schematic views of several cells illustrating the improvement of the invention. Each of the cells generally indicated at 2 comprises: (1) an anodic reaction zone which is the region internal to tubular cation-permeable barrier 4 and which contains a molten alkali metal reactant-anode 6 which is in electrical contact via lead 8 with an external circuit; (2) a reservoir 10 containing molten alkali metal which is supplied to the anodic reaction zone internal to cation-permeable barrier 4; (3) a cathodic reacton zone located between cation-permeable barrier 4 and tubular cell container 12 and filled with liquid electrolyte 14 described previously; and (4) one or more storage zones 16, 16' or 16" for said liquid electrolyte adapted to supply and/or receive the electrolyte to or from said cathodic reaction zone through conduits 18, 18' or 18".

Referring more specifically to the cell of FIG. 1, there is shown a means for flowing said liquid electrolyte 14 from storage zone 16 through said cathodic reaction zones and back to storage zone 16 comprising conduits 18' and 18" connecting storage zones or container 16 with said cathodic reaction zone such that liquid electrolyte 14 is circulated from storage zone 16 through one of conduits 18' or 18" to said cathodic reaction zone and back to storage zone 16 through the other of said conduits 18' or 18" by free convective flow. The term "free convective flow" as used herein refers to movement of a fluid in a gravitational field as a result of differing densities therein.

As will be readily apparent to those skilled in the art, all surfaces which are contacted by alkali metal polysulfide salts and sulfur e.g., storage zones conduits, containers should be noncorroding in the presence thereof. Such materials include, for example, graphite sealed by vitreous or pyrolytic carbons, various glasses and ceramics, metals with protective oxide or sulfide coatings, etc.

Whenever there are two different phases present in liquid electrolyte 14 during the charge/discharge cycle of said cell, i.e., sulfur and polysulfide salts of said alkali metal anode-reactant 6, free convective flow will normally occur since said polysulfide salts are of greater density than elemental sulfur.

Such a device may be adapted to create free correctective flow when there is none normally occuring or to enhance any normally occuring free convective flow by heating or cooling storage zone 16 by means not shown. Thus, storage zone 16 may be heated to a temperature above that of the cathodic reaction zone during the discharge cycle of the device and cooled to a temperature below that of the cathodic reaction zone during the charge cycle of the device. It will be noted that during the two phase portion of the charge/discharge cycle of the cell, such heating and cooling will merely enhances the normally occuring free flow thus aiding in the circulation of reactants. During the one phase portion of the charge/discharge cycle of the cell such heating and cooling induces free convective flow by creating different densities. By heating during discharge, sulfur present in storage zone 16 of the fully charged cell is made less dense than sulfur in the cathodic reaction zone and rises passing through conduit 18" to the cathodic reaction zone while denser sulfur in the cathodic reaction zone falls and passes through conduit 18' to storage zone 16. Of course, as greater and greater amounts of polysulfide salts are formed, the normal differences in density between the salts and the remaining elemental sulfur result in free convective flow which is enhanced by the heating of storage zone 16. Finally, the discharge proceeds to the one phase region in which all elemental sulfur has been discharged and only polysulfide salts remain to be discharged. The free convection of the polysulfide salts is maintained by the temperature difference between the cathodic reaction zone 14 and the storage zone 16. During charge the opposite flow would occur if storage zone 16 is cooled. By cooling during charge, polysulfide salt present in storage chamber 16 is made more dense than polysulfide salt in the cathodic reaction and falls passing through conduit 18' to the cathodic reaction zone while less dense polysulfide in the cathodic reaction zone rises and passes through conduit 18" to storage zone 16. Of course, as greater and greater amounts of elemental sulfur are formed, the normal differences in density of the two phases will result in free convective flow which is enhanced by the cooling of storage zone 16.

A preferred manner for inducing free convective flow when the liquid electrolyte is single phase in nature during either the charge or discharge cycles of the cell is by constantly cooling storage zone 16. Cooling, of course, takes less energy than heating because the storage zone can be designed to radiate, convect and conduct heat to the ambient environment, e.g., using cooling fins. It will be understood that cooling of the battery or cell cannot effectively be achieved by use of cooling means in direct proximity with the reaction zones because of the detrimental effects of uneven cooling therein. It is an advantage of this invention that uniform and effective cooling of the reaction zones can be achieved. Also, since it is contemplated that cells or batteries used at least in electric utility load levelling operations will have to be cooled anyway, the use of cooling to induce free convective flow is ideal.

In utility load-levelling applications sufficient energy density and battery capacity can be attained by charging and discharging the battery in the single phase region in which the liquid electrolyte consists of polysulfide salt only, i.e., no sulfur phase is present. If the cell is operated in the single phase region of the charge/discharge cycle the storage zone 16 could be constantly cooled. Cooling, as noted above, is also effective during charge in the two phase region. However, cooling would be counter-productive during discharge in the two-phase region.

The device illustrated in FIG. 1 is designed such that conduits 18' and 18", storage zone 16 and the cathodic reaction zone form a closed loop having substantially parallel elongated vertical portions. Such a design provides enhanced free convective flow due to the increased pressure differential resulting from the "chimney effect" obtained by increased vertical distances. Thus, any time that free convective flow is taking place it can be increased by designing the cell in a manner similar to that described.

Referring more specifically to the cell of FIG. 6, there is shown a second means for flowing liquid electrolyte 14 from storage zone 16 through said cathodic reaction zone and back to storage zone 16 comprising conduits (connecting storage zone 16 with said cathodic reaction zone) and pumping means 20 of any suitable type for circulating liquid electrolyte 14 between storage zone 16 and said cathodic reaction zone in the direction desired.

A third means for flowing liquid electrolyte 14 from a storage zone 16 through said cathodic reaction zone and into or back to storage is shown in FIG. 7 and comprises two conduits 18' and 18" connecting storage zone 16' and 16" with said cathodic reaction zone and means for adjusting pressure on said liquid electrolyte 14 within the two storage zones 16' and 16" so as to induce reciprocating flow of liquid electrolyte 14 between the storage zones 16' and 16" and through said cathodic reaction zone via conduits 18' and 18". The means for adjusting the pressure on the liquid electrolyte 14 in storage zones 16' and 16" could comprise, for example, means for introducing and removing quantities of inert gas through inlets 22 in the storage zones 16' and 16".

It will be understood from the drawings that the capacity of the storage zones should be such as to accommodate volume changes which occur in the liquid electrolyte during the charge/discharge cycle.

Various types of cells varying in the configuration and nature of the cathodic and anodic reaction zones may be employed with the various storage and flowing means within the purview of the invention and illustrated above.

One example of the many such cells which may be employed is shown in FIG. 1, which has been discussed in some detail above, particularly with respect to the storage zones and flowing means. The cell shown has a preferred tubular configuration with the cation-permeable barrier 4 being a tube concentrically disposed within tubular container 12. Container 12, as is well known to those in this art, may be conductive or nonconductive, but in any event must be a material which will withstand prolonged exposure to molten alkali metal polysulfide. The cathodic reaction zone contains a porous conductive material 24 which serves as the electrode which may be graphite felt or some other material which will withstand exposure to molten alkali metal polysulfide. The material 24 is in electrical contact with both the cation-permeable barrier 4 and with the external circuit via lead 26.

The porous conductive material 24 within the cathodic reaction may have several configurations. FIGS. 4 and 5 are horizontal cross-sectons of the cell of FIG. 1 taken along line 4/5–4/5. FIG. 5 shows one configuration wherein porous conductive material 24 fills substantially the entire cathodic reaction zone, i.e., the entire space between the container 12 and the cation-permeable barrier 4 which encloses anodic reactant 6.

Of course, the porous conductive material 24 may fill only a portion of the cathodic reaction zone. FIG. 4 shows the cross-section of such a cell wherein the material 24 is disposed so as to have arms which are normal to the tubular axis of the cell. Such a configuration is representative of cells described in U.S. patent application Ser. No. 545,048 discussed above. The devices described in that application, all of which may be employed in this invention, comprise a cathodic reaction zone in which porous conductive material 24 is disposed such that there are a plurality of channels and/or spaces within the zone which are free of material 24 and which in combination with material 24 are adapted to allow flow within the cathodic reaction zone of the liquid electrolyte 6. Still another example of this type of cell configuration would comprise a tubular cell wherein the cathodic reaction zone is filled with porous conductive material except for a plurality of vertical channels, the axes of which are substantially parallel with the vertical axis of the cell.

It should be noted that cells shown in FIG. 1 include manifold regions 28 into which conduits 18' and 18" enter and into which porous material 24 does not extend. The upper manifold 28 is located just below cover 30 which is sealed to the cation-permeable barrier. Generally, in cells of the design of FIG. 1, but without storage zones, i.e., a selfcontained unit, the distance between the container 12 and cation-permeable barrier 4 would be greater than about 1 cm. Although cells employing such spacing may be employed within the purview of the improvement of the invention, it is not necessary. Since the liquid electrolyte is supplied from storage zone 16, the spacing may be less than about 0.5 cm and is preferably less than about 0.2 cm.

Another cell configuration taught by Ser. No. 545,048 is shown in FIG. 2 as it might be adapted so as to employ the improvement of the invention. The device comprises a multiple tube array wherein a plurality of cation permeable barrier tubes 4 are disposed within container 12. Tubes 4 containing anodic reactant 6 extend upward to reservoir 10 from wich the anodic reactant is supplied. In the design shown the electrode also takes the form of tubular members of porous conductive material 24 which is disposed around the tubular barriers 4 within the cathodic reaction zone defined by container 12 and barrier tubes 4. The design shown provides manifold zones 28 above where tubular conductive material 24 ends at the top of the cell and below the point where the tubular barriers 4 and tubular conductive material 24 end at the bottom of the cell. This allows for even distribution of the liquid electrolyte which passes into and out of the cathodic reaction zone through conduits 18. FIG. 3 shows a horizontal cross-section of the multi-array cell of FIG. 2 taken along line 3—3.

A final example of the type of cells which may be employed in shown in FIGS. 6 and 7, both of which have also been discussed above in some detail, particularly with respect to the storage zones and the two types of flowing means illustrated therein. In the cells of FIGS. 6 and 7, the cathodic reaction zone defined by container 12 and cation-permeable barrier 4 contains no porous conductive material which acts as an electrode. In these cells the only electrode present is the container 12. Of course, the electrode need not be the cell container; thus, a modification of this type of cell would be where the electrode merely surrounds the cation-permeable barrier 4 and yet itself is confined within a cell container, e.g., a pyrex tube. In any event, the device is such that the electrode and the cation-permeable barrier comprise substantially parallel major boundaries of the cathodic reaction zone. Since the device of this type does not include a separate electrode of porous conductive material, it is essential that the space between the electrode and the cation-permeable barrier, i.e., the distance across the cathodic reaction zone, be less than about 0.5 cm. and preferably less than about 0.2 cm.

While the cells of the type shown in FIGS. 6 and 7, when combined with a storage zone(s) and flowing means may be operated in both the one-phase and two-phase regions of the charge/discharge cycle, they are ideal for use when operation only within the one-phase region is desired or required. It is ideal for one-phase operation since the one-phase system is a less viscous, as well as a high reaction rate system requiring less electrode area. The result is that a higher power density is achieved. As mentioned above, the bulk electrode may be either container 12 or it may be merely inserted or confined in another container. Among the materials which could be used to form the electrode, when it is the container would be certain metals, when protected by their oxides or sulfides, graphite, coated and sealed by pyrolytic or vitreous carbon, metal-graphite, vitreous carbon, metal oxides, metal carbides or other conductors.

All of the above can be used when the electrode is inserted or confined in another container. In addition other conducting materials which are penetrable by sulfur, polysulfide salts, or gases can be inserted into the container, e.g., graphite or pervious metal oxides. In any event, the container material should be vacuum-tight corrosion resistant to sulfur and polysulfide and formable into cylindrical or flat plate structures.

Cell configurations shown and discussed above are only representative of those within the scope of the invention and are not intended to be limiting. Various combinations of storage zones and flowing means with various anodic and cathodic reaction zone configurations are included within the scope of this invention. Thus, any of the storage and flowing means described as well as others within the purview of the invention may be employed in combination with any of the configurations for anodic and cathodic reaction zone configurations illustrated as well as others within the scope of the invention.

What is claimed is:

1. A secondary battery or cell comprising:
   A. One or more anodic reaction zones containing a molten alkali metal reactant-anode in electrical contact with an external circuit;
   B. One or more cathodic reaction zones containing (1) a cathodic reactant comprising a liquid electrolyte which is electrochemically reversibly reactive with said anodic reactant and which, when said cell or battery is at least partially discharged, is selected from the group consisting of (i) a single phase composition comprising molten polysulfide salts of said anodic reactant and (ii) a two-phase composition comprising molten sulfur and molten sulfur saturated polysulfide salts of said anodic reactant and (2) an electrode in contact with said liquid electrolyte;
   C. One or more cation-permeable barriers to mass liquid transfer interposed between and in contact with said anodic and cathodic reaction zones, said electrode being in electrical contact with both said cation-permeable barrier and said external circuit;
   D. One or more storage zones for said liquid electrolyte separate from said one or more cathodic reaction zones but connected thereto; and
   E. Means for flowing said liquid electrolyte by free convective flow from at least one of said storage zones, through said one or more cathodic reaction zones, and out of said cathodic reaction zones to at least one of said storage zones.

2. A secondary battery or cell in accordance with claim 1 wherein said means for flowing said liquid electrolyte comprises at least two conduits connecting at least one of said storage zones with said one or more cathodic reaction zones such that said liquid electrolyte is circulated through said conduits between said storage zone and said one or more cathodic reaction zones.

3. A secondary battery or cell in accordance with claim 2 wherein said conduits, said storage zones and said one or more cathodic reaction zones form at least one closed loop having substantially parallel elongated vertical portions such that during the portion of the charge/discharge cycle of said battery or cell when said liquid electrolyte is a two-phase composition free convective flow is enhanced.

4. A secondary battery or cell in accordance with claim 2 wherein said battery or cell is adapted such that a temperature differential may be maintained between said storage zones and said cathodic reaction zones.

5. A secondary battery or cell in accordance with claim 2 wherein said electrode comprises a porous conductive material.

6. A secondary battery or cell in accordance with claim 2 wherein said porous conductive material substantially fills said one or more cathodic reaction zones.

7. A secondary battery or cell in accordance with claim 2 wherein said porous conductive material is disposed within said one or more cathodic reaction zones so as to leave a plurality of channels or spaces which are free of said material and which, in combination with said porous conductive material, are adapted to allow flow within said cathodic reaction zone of said liquid electrolyte.

8. A secondary battery or cell in accordance with claim 2 wherein said electrode and said cation-permeable barrier comprise substantially parallel major boundaries of said cathodic reaction zone which are spaced from each other by less than about 0.5 cm such that said liquid electrolyte flows therebetween.

9. A secondary battery or cell in accordance with claim 2 wherein said electrode and said cation-permeable barrier comprise substantially parallel major boundaries of said cathodic reaction zone which are spaced from each other by less than about 0.2 such that said liquid electrolyte flows therebetween.

10. A secondary battery or cell in accordance with claim 3 wherein said device comprises one of said cathodic reaction zones, a plurality of said anodic reaction zones and a plurality of said cation-permeable barriers.

11. A secondary battery or cell in accordance with claim 4 wherein said storage zones are adapted to be heated to a temperature above that of said cathodic reaction zones during discharge and cooled to a temperature below that of said cathodic reaction zones during charge.

12. A secondary battery or cell in accordance with claim 4 wherein said storage zones are adapted to be maintained at a temperature below that of said one or more cathodic reaction zones so as to enhance free convective flow during that portion of the charge/discharge cycle of said battery when said liquid electrolyte is a single phase composition.

13. A secondary battery or cell in accordance with claim 11 wherein said conduits, said storage zones and said one or more cathodic reaction zones form at least one closed loop having substantially parallel elongated vertical portions such that free convective flow is enhanced.

14. A secondary battery or cell in accordance with claim 12 wherein said conduits, said storage zones and said one or more cathodic reaction zones form at least one closed loop having substantially parallel elongated vertical portions such that free convective flow is enhanced.

15. A secondary battery or cell in accordance with claim 8 wherein said electrode comprises the container wall for said battery or cell.

16. A secondary battery or cell comprising:
   A. One or more anodic reaction zones containing a molten alkali metal reactant-anode in electrical contact with an external circuit;
   B. One or more cathodic reaction zones containing (1) a cathodic reactant comprising a liquid electrolyte which is electrochemically reversibly reactive with said anodic reactant and which, when said cell or battery is at least partially discharged, is elected from the group consisting of (i) a single phase composition comprising molten polysulfide salts of said anodic reactant and (ii) a two-phase composition comprising molten sulfur and molten sulfur saturated polysulfide salts of said anodic reactant and
(2) an electrode in contact with said liquid electrolyte;

C. One or more cation-permeable barriers to mass liquid transfer interposed between and in contact with said anodic and cathodic reaction zones, said electrode being in electrical contact with both said cation-permeable barrier and said external circuit;

D. Two or more storage zones for said liquid electrolyte separate from said one or more cathodic reaction zones but connected thereto; and E. Means for flowing said liquid electrolyte from at least one of said storage zones through said one or more cathodic reaction zones and out of said cathodic reaction zones to at least one of said storage zones, said means comprising 1) at least two conduits connecting at least two of said storage zones with said one or more cathodic reaction zones and 2) means for adjusting pressure on said liquid electrolyte within such storage zones so as to induce reciprocating flow between said storage zones and through said one or more cathodic reaction zones.

17. A secondary battery or cell in accordance with claim 16 wherein said electrode comprises a porous conductive material.

18. A secondary battery or cell in accordance with claim 16 wherein said electrode annd said cation-permeable barrier comprises substantially parallel major boundaries of said cathodic reaction zone which are spaced from each other by less than about 0.5 cm such that said liquid electrolyte flows therebetween.

19. A secondary battery or cell in accordance with claim 16 wherein said electrode and said cation-permeable barrier comprise substantially parallel major boundaries of said cathodic reaction zone which are spaced from each other by less than about 0.2 cm such that said liquid electrolyte flows therebetween.

20. A secondary battery or cell in accordance with claim 17 wherein said porous conductive material substantially fills said one or more cathodic reaction zones.

21. A secondary battery or cell in accordance with claim 17 wherein said porous conductive material is disposed within said one or more cathodic reaction zones so as to leave a plurality of channels or spaces which are free of said material and which, in comination with said porous conductive material, are adapted to allow flow within said cathodic reaction zone of said liquid electrolyte.

22. A secondary battery or cell in accordance with claim 21 wherein said device comprises one of said cathodic reaction zones, a plurality of said anodic reaction zones and a plurality of said cation-permeable barriers.

23. A secondary battery or cell in accordance with claim 18 wherein said electrode comprises the container wall for said cell or battery.

* * * * *